United States Patent
Benito López

(10) Patent No.: US 10,329,188 B2
(45) Date of Patent: Jun. 25, 2019

(54) COMPACTED CERAMIC MATERIALS WITH LOW POROSITY

(71) Applicant: COSENTINO RESEARCH & DEVELOPMENT, S.L., Almeria (ES)

(72) Inventor: José Manuel Benito López, Almeria (ES)

(73) Assignee: CONSENTINO RESEARCH & DEVELOPMENT, S.L., Almeria (ES)

( * ) Notice: Subject to any disclaimer, the term of this patent is extended or adjusted under 35 U.S.C. 154(b) by 0 days.

(21) Appl. No.: 15/575,736

(22) PCT Filed: Jun. 6, 2016

(86) PCT No.: PCT/EP2016/062804
§ 371 (c)(1),
(2) Date: Nov. 20, 2017

(87) PCT Pub. No.: WO2016/193500
PCT Pub. Date: Dec. 8, 2016

(65) Prior Publication Data
US 2018/0290918 A1 Oct. 11, 2018

(30) Foreign Application Priority Data

Jun. 5, 2015 (ES) .................................. 201530795

(51) Int. Cl.
| | | |
|---|---|---|
| *C04B 35/19* | (2006.01) | |
| *C04B 33/04* | (2006.01) | |
| *C03C 10/00* | (2006.01) | |
| *C04B 33/13* | (2006.01) | |
| *C04B 33/24* | (2006.01) | |
| *C04B 33/32* | (2006.01) | |
| *C04B 35/00* | (2006.01) | |
| *C04B 35/626* | (2006.01) | |
| *C04B 35/64* | (2006.01) | |
| *C03B 1/02* | (2006.01) | |
| *C03B 32/02* | (2006.01) | |

(52) U.S. Cl.
CPC ............ *C03C 10/0018* (2013.01); *C03B 1/02* (2013.01); *C03B 32/02* (2013.01); *C04B 33/04* (2013.01); *C04B 33/131* (2013.01); *C04B 33/24* (2013.01); *C04B 33/323* (2013.01); *C04B 35/00* (2013.01); *C04B 35/6261* (2013.01); *C04B 35/62655* (2013.01); *C04B 35/64* (2013.01); *C03C 2204/00* (2013.01); *C04B 2235/3472* (2013.01); *C04B 2235/36* (2013.01); *C04B 2235/5436* (2013.01); *C04B 2235/604* (2013.01); *C04B 2235/6565* (2013.01); *C04B 2235/6567* (2013.01); *C04B 2235/662* (2013.01); *C04B 2235/77* (2013.01); *C04B 2235/80* (2013.01); *C04B 2235/94* (2013.01)

(58) Field of Classification Search
CPC .............................. C04B 35/19; C04B 33/24
See application file for complete search history.

(56) References Cited

U.S. PATENT DOCUMENTS

2015/0209984 A1\* 7/2015 Benito Lopez ........... E04C 2/02
428/220

FOREIGN PATENT DOCUMENTS

| EP | 2 889 437 | 7/2015 |
|---|---|---|
| WO | WO 2004/013066 | 2/2004 |
| WO | WO 2014/009585 | 1/2014 |

OTHER PUBLICATIONS

Alves et al., Journal of European Ceramic Society, Aug. 2012, 32, 2095-2102 "Effect of feldspar particle size on the porous microstructure and stain resistance of polished porcelain tiles".
Matteucci Fetal: "Effect of soda-lime glass on sintering and technological properties of porcelain stoneware tiles", Ceramics International, Elsevier, Amsterdam, NL, vol. 28, No. 8, Jan. 1, 2002 (Jan. 1, 2002 ), pp. 873-880, XP004388716, ISSN: 0272-8842, DOI: 10.1016/S0272-8842(02)00067-6.
Tenorio Cavalcante PM et al: "The influence of microstructure on the performance of white porcelain stoneware", Ceramics International, Elsevier, Amsterdam, NL, vol. 30, No. 6, Jan. 1, 2004 (Jan. 1, 2004 ), pp. 953-963, XP004516838, ISSN: 0272-8842, DOI: 10.1016/J.CERAMINT.2003.11.002.
Esposito L et al: "The use of nepheline-syenite in a body mix for porcelain stoneware tiles", Ceramics International, Elsevier, Amsterdam, NL, vol. 31, No. 2, Jan. 1, 2005 (Jan. 1, 2005 ), pp. 233-240, XP027796065, ISSN: 0272-8842 [retrievad on Jan. 1, 2005].
Zanelli C et al: "The vitreous phase of porcelain stoneware: Composition, evolution during sintering and physical properties", Journal of Non-Crystalline Solids, vol. 357, No. 16, Jun. 7, 2011 (Jun. 7, 2011), pp. 3251-3260, XP028231576, ISSN: 0022-3093, DOI: 10.1016/J.JNONCRYSOL.2011.05.020 [retrieved on May 27, 2011].
S.H. Jazayeri et al: "A kinetic study on the development of porosity in porcelain stoneware tile sintering", Bal. Soc. Esp. Ceram. V., 46 (1 ), 2007, Feb. 28, 2007 (Feb. 28, 2007), pp. 1-6, XP55295815, Retrieved from the Internet: URL:http://boletines.secv.es/upload/20070113132809.46[1]1-6.pdf [retrieved on Aug. 16, 2016].

\* cited by examiner

*Primary Examiner* — Karl E Group
(74) *Attorney, Agent, or Firm* — Leason Ellis LLP

(57) ABSTRACT

The invention relates to a high-performance compacted ceramic material, comprising between 40%-85% by weight of glassy phase, having a density between 2.3 and 3.0 g/cm3, and characterized in that it has an internal porosity of less than 4% by volume. This material is highly resistant to mechanical and chemical action, sparingly permeable and prevents staining, so it is extremely suitable as a building material, particularly for kitchen countertops.

18 Claims, No Drawings

COMPACTED CERAMIC MATERIALS WITH LOW POROSITY

CROSS-REFERENCE TO RELATED PATENT APPLICATIONS

This application is a U.S. National Phase Application under 35 U.S.C. § 371 of International Patent Application No. PCT/EP2016/062804, filed Jun. 6, 2016, and claims the priority of Spanish Patent Application P201530795, filed Jun. 5, 2015, each of which is incorporated by reference as if expressly set forth in their respective entirety herein.

FIELD OF THE INVENTION

The present invention relates to high-performance ceramic materials with a very low internal porosity and products comprising these materials.

BACKGROUND OF THE INVENTION

In ceramic materials, and specifically in ceramic floorings and coverings, porosity has a significant effect on mechanical and surface characteristics of materials.

In conventional ceramic materials, porosity values are minimum (close to zero) on the surface of the material due to the firing kiln process, which generates a closed-pore surface layer, whereas internal porosity is greater (2-5%). As a result, when the fired materials are subjected to any surface mechanical action (polishing), the surface layer thins out or disappears, and the internal porosity is exposed, affecting the properties of the material (reactivity, staining).

Porosity in ceramic materials or the like that are obtained by molding or pressing and subsequent firing depends on the characteristics of the starting materials and on the manufacturing process. Therefore, insufficient firing, the presence of organic material hindering combustion in the first stages of the heating process, or an irregular compaction or shaping process can substantially alter the porosity of the end product and therefore its properties.

Depending on the chemical composition of the product and on the shaping/firing process different types of porosity in ceramic materials are distinguished: "open porosity," "closed porosity" or a combination of both. Open porosity is formed by interconnected pores leading to the formation of channels, whereas closed porosity relates to pores that are isolated from others in the ceramic matrix. Porosities in ceramic materials cover a broad range, from very open porosities to less open or closed porosities. In all cases, the porosity and the nature of said porosity are closely related to the characteristics and composition of the surrounding solid material.

When fired ceramic material is subjected to polishing, closed and open porosities are exposed on the surface of the ceramic material, affecting the properties of the material. The greater the porosity, the more reactivity or staining issues there are.

This porosity on the surface can be reduced by applying a layer of glaze that seals the surface. However, in the polishing step these protective surfaces are removed or erode the surface where they were applied, again leaving the closed porosity of the material exposed. In addition, given that the glaze is only present on the surface, the edge of the product clearly shows the lack of homogeneity of the product.

In unglazed materials, one of the most widely known being "through-body porcelain," more attention is paid to the appearance of porosity than in glazed materials, but the porosity levels reached are not enough to fully protect the product against stainability with many chemical substances. For this reason, many manufacturers apply organic or inorganic sealing products serving as a surface protection. However, depending on how the surface will be used, sealers can break down, rendering them inefficient and leading to drawbacks of another type.

When closed porosity levels in the product are low enough, the surface reaction exposed by means of a mechanical action is very good. An outer surface having a low porosity is no longer affected by chemical reagents and the usual staining agents. However, the total lack of porosity in ceramic materials is undesirable because pores can absorb produced stresses, impacts, etc., and therefore the lack thereof leads to brittleness and fracture issues in the material during processing. An example is glass, which lacks porosity but at the same time is very brittle.

In the case of manufacturing ceramic materials for use in kitchen countertops, "surface glazes" cannot be used to eliminate the porosity, because since it is a 3D product, the aesthetic integration between surface and edge would be broken. In addition, applying products known as "sealers" on the surface may violate regulations concerning contact with food. For these reasons, porosity levels must be reduced to a limit where stainability levels are insignificant by means controlling the chemical composition of the material and the method of manufacture.

In the case of inorganic ceramic products, their properties are virtually marked by the porosity of the material and by its chemical nature. These ceramic materials have a composition essentially based on three raw materials: clay minerals (clays and kaolins), sodium-potassium feldspars and feldspathic sand or quartz sand. In particular, feldspars act as melting during the firing step, being useful as a bridge for binding particles together and contributing to densification of the material.

Alves et al., *Journal of European Ceramic Society*, 2012, 32, 2095-2102 "Effect of feldspar particle size on the porous microstructure and stain resistance of polished porcelain tiles" describe the effect of feldspar particle size on the porous microstructure and the stain resistance of polished porcelain tiles.

Patent document WO2004/013066 describes stain-resistant vitrified porcelain products with very low or nil porosity as a result of particle packing, it specifically uses a five-component system to achieve a packing density close to 99%, and of the method of manufacture.

Patent document WO2014/009585 describes a new method for manufacturing high-performance ceramic materials, comprising a grinding step for grinding the raw materials to sizes of less than 200 micrometers, compacting and pressing at very high pressures to give rise to an ultra-compacted shaped product and a firing process. The obtained pieces have very good chemical and mechanical properties and can be made in large sizes.

Despite the different existing materials, there is still a need to provide compacted ceramic materials having large dimensions with very low internal porosity, and which can therefore be processed and polished without creating surface porosity. Furthermore, these materials must have high mechanical performance suitable for being used as building materials, such as outer covering and floor surfaces, for example, and in particular for manufacturing kitchen countertops.

OBJECT OF THE INVENTION

The inventors have discovered a ceramic material that, as a result of the selection of starting materials and their particle size, has a porosity of less than 4% by volume and is a closed-type ceramic material after firing, without any interconnection between neighboring pores while at the same time maintaining excellent mechanical properties, making it extremely suitable for use as a building material. Its low porosity means that it is very resistant to the action of chemical products, even when the surface has been polished.

In a first aspect, the present invention relates to a compacted ceramic material comprising between 40%-85% by weight of glassy phase, having a density between 2.3 and 3.0 g/cm$^3$, and characterized in that it has an internal porosity of less than 4% by volume.

Preferably, the ceramic material comprises from 50 to 70% by weight of feldspars.

In another aspect, the invention relates to building products made with the ceramic material defined above, in particular for covering floors and for kitchen countertops.

Likewise, the present invention provides a method for preparing these low-porosity ceramic materials, comprising the following steps:
a) Grinding the raw materials to reduce them to a particle size of less than 100 microns;
b) Shaping and compacting the raw materials obtained in step a) at pressures exceeding 400 kg/cm$^2$;
c) Firing the product obtained in step b) at a maximum temperature comprised between 1,000° C. and 1,200° C.

DETAILED DESCRIPTION OF THE INVENTION

The term "ceramic material" refers to a material consisting of inorganic, polycrystalline, non-metallic compounds, the fundamental characteristic of which is that they are consolidated in solid state by means of high-temperature heat treatments (firing) and are formed by a combination of crystalline and glassy phases. The inorganic compounds are formed by metallic and non-metallic elements bound by ionic or covalent bonds.

In the context of the present invention, the term "ceramic material" or "compacted ceramic material" or "ultra-compacted ceramic material" refers to ceramic materials that have been compacted at pressures exceeding 400 kg/cm$^2$.

In the present invention, "glassy phase" is understood to mean the amorphous, non-crystalline phase between the crystalline phase grains. The percentage by weight of glassy phase is determined by means of the usual methods in the field of ceramics, such as by means of x-ray diffraction, for example.

"Internal porosity" is understood to mean the empty space within the ceramic material and is expressed in % by volume. The methods of measuring porosity in ceramic materials are known by the person skilled in the art. Among said methods, the following are included: mercury porosimetry, porosity measurements in an autoclave based on impregnating with water or simply using the Archimedes' principle. Internal porosity has been determined at room temperature. In an embodiment, it refers to the internal porosity measured at room temperature and a pressure of 600 mmHg.

In a particular embodiment, the internal porosity is less than 2% by volume, preferably less than 1% by volume, more preferably less than 0.5% by volume, even more preferably less than 0.1% by volume.

In an embodiment, the internal porosity is comprised between 0.00 and 2% by volume or between 0.01 and 2% by volume, preferably between 0.01 and 0.5% by volume, preferably between 0.01 and 0.3% by volume, more preferably between 0.01 and 0.1% by volume, even more preferably between 0.01 and 0.05% by volume.

In another embodiment, the internal porosity is comprised between 0.05 and 0.5% by volume, preferably between 0.1 and 0.3% by volume.

The internal porosity values of the present document refer to values measured in an autoclave based on impregnating with water.

The ceramic materials of the invention that may be obtained from very pure raw materials, in the form of micrometric particles, and by means of high shaping pressures and consolidated in solid state at high sintering temperatures, with a glassy phase of between 40%-85% by weight, are almost completely densified bodies, with virtually no internal pores, cracks and flaws, giving them excellent technical features: high mechanical, thermal, abrasion and chemical etching resistances.

The compacted ceramic material provided by the present invention has a density comprised between 2.3 and 3.0 g/cm$^3$, preferably between 2.4 and 2.7 g/cm$^3$. In a particular embodiment, the density of the compacted ceramic material is comprised between 2.5 and 2.7 g/cm$^3$. More preferably, the compacted ceramic material has a density of 2.6 g/cm$^3$. The density measurements provided in the present invention have been taken by immersion in water applying Archimedes' principle. Density has been determined at room temperature.

In one aspect of the invention, the mineral particles used in manufacturing the ceramic materials of the invention are substances with a particle size of less than 200 micrometers, preferably less than 100 micrometers, a size in the order of tens of microns, between 10-90 micrometers, is particularly preferred. More preferably, a particle size between 10 and 50 micrometers is used. The particle size is statistical and refers to the mean size determined by means of sieves, as is usual in the materials field, determining the % of particles that go through a specific sieve. Preferably, at least 95% of the particles of the materials used to prepare the ceramic material of the invention go through a 45 μm sieve, more preferably at least 98% of the particles of the materials used to prepare the ceramic material of the invention go through a 45 μm sieve.

These particles are preferably obtained by wet grinding the starting raw materials and spray drying, which techniques are known in the field of ceramics.

The starting materials can have different compositions, although there is preferably an amount of non-siliceous melting materials which allow obtaining 40-85% of glassy phase.

The high glassy phase content of the ceramic material of the invention gives it special properties, because it is capable of closing internal pores. This phase occurs as a result of the semi-liquid state solidification phase which easily closes pores as a result of the low viscosity.

The compacted ceramic material according to the invention may contain from 40% to 85% by weight of glassy phase, preferably between 40 and 75% by weight, even more preferably between 45 and 70% by weight, even more preferably between 50 and 65% by weight of glassy phase based on the total weight of the compacted ceramic material.

In an embodiment of the invention, the starting materials comprise the following materials in the indicated ranges:
Clays, 20-35% by weight
Kaolins, 5-15% by weight
Feldspars, 50-70% by weight Preferably, the feldspars have a particle size of less than 40 micrometers.

According to the present invention, the term "clays" may refer to clay, shales, and other natural or synthetic brick-making material. The clays provide plasticity for shaping the starting product. Since they are mixtures of minerals that usually have particle sizes in the range of tens of micrometers, they generally do not have to be subjected to an intensive grinding process, which allows maintaining the plastic properties of the clay. The clays used are very plastic so as to allow correct shaping of the overall mixture because the large amount of feldspars contained in the formula hinder the pressing thereof.

Clays according to the present invention are principally selected from hydrosilicates of alumina and may include clay minerals such as smectites (such as montmorillonite, nontronice, sapolite, and the like), kaolins (such as kaolinite, dickite, halloysite, nacrite, and the like), illites (such as illite, clay-micas and the like), chlorites (such as clinochlore, chamosite, nimite, pennantite, and the like), attapulgites, sepiolites, and the like. Further, clays may also contain minerals such as quartz, sylvine or siderite in its composition along with other various trace components.

In a particular embodiment, the clays comprise montmorillonite, illite and kaolinite. Preferably, the clays comprise at least 60% by weight of montmorillonite, illite and kaolinite based on the total weight of the clays. More preferably, at least 65% or at least 70% by weight.

The term "kaolins" refers to a clay containing the mineral kaolinite as its principal constituent. Preferably, kaolinite is the only plastic component in kaolins. Kaolins may further contain other impurities, such as quartz, mica, phosphates, fine clay impurities such as certain smectite clay constituents and various other species, e.g. compounds containing transition elements such as iron.

In a particular embodiment, kaolins comprise at least 60% by weight of kaolinite based on the total weight of kaolins.

Feldspars give special properties to the ceramic material of the invention. They provide quartz content in addition to sodium and potassium oxides. They act as melting in the firing process and reduce porosity in the final material. They represent over 50% of the materials, preferably 50-70%, more preferably 55-60% by weight.

Feldspars are aluminosilicates containing sodium, potassium, calcium or barium. In a particular embodiment, the feldspars comprise sodium and potassium feldspars.

In an embodiment of the invention, the feldspars contain potassium feldspar in a range of 15-25% by weight out of the total raw materials, and sodium feldspar in a range of 35-45% by weight out of the total raw materials.

Preferably, at least 95%, more preferably at least 99%, even more preferably at least 99.7% of the feldspar particles have a size less than or equal to 40 μm.

Sodium feldspar acts as a lower viscosity melting, quickly creating bridges for binding particles together, particularly as a result of the small sizes of the particles and of feldspar itself. It eliminates the internal porosity of the material during the sintering process.

Potassium feldspar provides greater viscosity to the melting, which helps maintain the stability and shape of the product during the firing process.

In the present invention, the size of feldspar particles is also reduced by micronizing to tens of microns. By reducing the size of the feldspar particles, the specific surface, and therefore the reactivity of said particles, increases. As a result of this effect, bridges are generated between particles resulting in a compacted material where the pores are isolated from others, generating a closed porosity throughout the entire volume. Furthermore, the increase in the reactivity of the particles allows reducing the firing temperature from 1,180° C. to 1,140° C., preventing pyroplastic deformation.

Preferably the starting materials have a high purity, which allows precise control of the compositions and prevents flaws in the material. For example, an undetermined organic matter content can cause the occurrence of considerable pores and flaws during firing due to combustion thereof. The presence of unwanted mineral materials can affect glassy phase formation, bring about internal stresses or issues of planarity or generation of residual porosity.

In one embodiment, the purity of the selected materials exceeds 90% by weight in the feldspathic compounds.

Once the starting materials are selected and reduced to the desired size, they can be stored in order to be used at the appropriate time. Preferably, the different materials are mixed uniformly and to a suitable moisture content that allows shaping and pressing prior to firing.

Preferably the material is mixed with water, or dried if it was obtained through a wet process, so that the amount of water is between 4 and 12% by weight, preferably between 4%-9% by weight, more preferably between 6% and 9% by weight.

After preparing the mixture of particles forming the raw material, in an embodiment of the invention the method includes a compacting step using a continuous pressing station, comprising compacting means in the form of a compacting roller and belt. In a particular embodiment, the mixture of particles of raw materials are compacted at a pressure of between 30 and 110 kg/cm$^2$, preferably between 40 and 100 kg/cm$^2$, more preferably between 60 and 80 kg/cm$^2$. If required, the product is cut into the desired shape after compacting, for example in the form of a rectangular slab.

After compacting, and optionally cutting, the method includes a pressing step carried out at very high pressures, which generates ultra-compacting of the material prior to firing. This step contributes to reducing the porosity in the end product and makes the sintering process easier. In this pressing, pressures can exceed 400 kg/cm$^2$, preferably exceeding 450 kg/cm$^2$, and more preferably exceeding 500 kg/cm$^2$. In a particular embodiment, the pressure is comprised between 400 and 450 kg/cm$^2$, more preferably between 410 and 440 kg/cm$^2$, even more preferably between 410 and 430 Kg/cm$^2$.

Once the product is shaped and the materials ultra-compacted, drying and firing can be performed.

Before drying, the product may have a water content of up to 10% by weight. Drying reduces the water content without deforming the piece, so that the final content of water in the product is of up to 0.7% by weight, preferably of up to 0.5% by weight, more preferably of up to 0.3% by weight. Drying can be done in a specific installation, which allows storing the dried pieces before firing them, making it easier to manage the pieces in stock. Alternatively, drying can be done in the firing kiln, as a step immediately prior to firing.

During firing, the glassification and sintering process generates a viscous liquid phase that contributes to reducing porosity when firing the product of the invention. The formation of a viscous glassy phase which surrounds the most refractory particles, and under forces of the surface tension created by the fine pores of the piece, tends to bring the particles closer to one another, increasing shrinkage and reducing the porosity of the product, takes place during firing. The high density of the starting product resulting from the ultra-compaction process and the selection of the particle size (preferably between 10 and 50 μm) give the product specific characteristics that make the glassification and sintering process faster, and it results in a smaller pore volume and in the maintenance of suitable technical characteristics in the end product; these properties can be seen when the material is polished.

Preferably the firing in the firing cycle the material is heated to maximum temperatures comprised between 1,000° C. and 1,200° C., more preferably between 1,000° C. and 1,180° C. A maximum temperature range comprised between 1,120° C. and 1,160° C. is particularly preferred, even more preferably a range comprised between 1,140° C. and 1,150° C. Melting and sintering occur at these temperatures, but deformation of the pieces, for example due to the action of gravity, is prevented. Preferably, the time at the maximum firing temperature is comprised between 5 and 60 min.

In a particular embodiment, the firing cycle to which the material is subjected (including heating the material, residence time at the maximum temperature and cooling) has a duration of up to 9 hours. Preferably, the firing cycle has a duration between 1 and 9 hours, preferably between 90 and 500 min, depending on the thickness of the piece. For instance, 90 min might be sufficient for pieces of 8 mm thickness, whereas longer times such as 500 min might be necessary for pieces of 3 cm thickness.

The method of manufacturing the ceramic material of the invention can include additional conventional steps, such as, for example, the addition of coloring substances, for example after the grinding step, the formation of decorative veins using mineral powders of different colors, elimination of metallic particles, etc.

In addition to a low porosity, high density and glassy phase content, the product of the invention has unique mechanical properties allowing it to be manufactured in large sized pieces, even exceeding 3 meters in length and 1.5 meters in width, and with a thickness that can reach up to 3 cm or more if required.

In a particular embodiment, the compacted ceramic material has lateral dimensions of up to 4×2 m², preferably of up to 3.20×1.44 m², more preferably comprised between 3×1 m² and 4×2 m². In a preferred embodiment, the compacted ceramic material has lateral dimensions of 3.20×1.44 m².

In another particular embodiment, the compacted ceramic material has a thickness of at least 0.7 cm, preferably of 1 cm, 2 cm or 3 cm. Preferably, it has a thickness between 0.7 and 3 cm. Preferably, the compacted ceramic material has lateral dimensions of up to 4×2 m² and a thickness of at least 0.7 cm. More preferably, the compacted ceramic material has lateral dimensions of at least 3 meters in length and 1.4 in width or of 3.20×1.44 m² and a thickness of at least 0.7 cm, preferably at least 1 cm, preferably at least 2 cm, more preferably at least 3 cm.

Preferably the compacted ceramic material is in the form of a slab with lateral dimensions of 3.20×1.44 m² and a thickness of between 0.7 and 3 cm.

These properties mean that the compacted ceramic materials of the invention are excellent for use thereof as a building material. The high chemical and physical resistance, and the large manufacturing dimensions allow the use thereof in the covering of floors and façades, where they are inert to the action of solar radiation, chemical agents, have a high degree of hardness and controlled internal stress level allowing the pieces to be cut and handled without breaking.

A particularly preferred application for the ceramic materials of the invention are kitchen countertops. The high chemical resistance and hardness thereof allow contact with food, food colorants, and drinks such as wine or coffee without generating stains and without affecting the properties thereof. Furthermore, the possibility of manufacturing thicknesses of 3 cm or more gives the countertop an appearance similar to that of natural stones.

The invention is illustrated below by means of examples, which must not be interpreted as being limiting of the invention, which is defined by the claims.

EXAMPLES

Example 1

The following starting materials and amounts by weight were used in the following example:
- 30% clay (comprising at least 60 wt % of montmorillonite, illite and kaolinite and wherein the reject at a 125 μm sieve is about 4.5%),
- 15% kaolin (comprising at least 60 wt % of kaolinite and wherein the reject at a 53 μm sieve is less than 1%),
- 38% sodium feldspar (wherein the particles have an average size of less than 300 μm, and the content of sodium is of at least 10% by weight),
- 17% potassium feldspar (wherein 75% of the particles have an average size of less than 100 μm, and the content of potassium is of at least 14% by weight), A first grinding of the clay materials is performed in an industrial grinder, generating a slip with a particle size below 45 μm with the following characteristics:
Density=1.600 g/cm³
Viscosity=20 s
Reject at 40 μm=0.1%

The resulting slip is stored in a reservoir where it is kept under continuous agitation.

In a second grinding the size of the feldspathic materials and the remaining materials is reduced until achieving a particle size below 45 μm.
Density=1.690 g/cm³
Viscosity=24 s
Reject at 40 μm=0.9%

This second slip is unloaded in the reservoir where the slip resulting from the first grinding is located and it is all subjected to agitation.

Spray drying is then performed until achieving a product with a water content of 8% by weight.

The wet material is subjected to shaping and ultra-pressing at 450 kg/cm².

It is then dried by means of heat in a drying line until achieving a product with a water content of 0.5% by weight.

The dry product is subjected to firing at a cycle of 180 min, reaching a maximum temperature of 1,155° C.

The resulting product has the following characteristics:
2 cm thickness, 3.2 meters in length and 1.44 in width.
9% shrinkage
0.00% internal porosity measured by means of an autoclave by impregnating with water at room temperature and 600 mmHg
2.500 g/cm³ measured by immersion in water applying Archimedes' principle at room temperature
79% of glassy phase.

Example 2

The following starting materials and amounts by weight were used in the following example:

29% clay (comprising at least 60 wt % of montmorillonite, illite and kaolinite and wherein the reject at a 125 μm sieve is about 4.5%), 8% kaolin (comprising at least 60 wt % of kaolinite and wherein the reject at a 53 μm sieve is less than 1%), 38% sodium feldspar (wherein the particles have an average size of less than 300 μm, and the content of sodium is of at least 10% by weight), 15% potassium feldspar (wherein 75% of the particles have an average size of less than 100 μm, and wherein the content of potassium is of at least 14% by weight), 10% by weight of an alumina and zircon pigment A first grinding of the clay materials is performed in an industrial grinder, generating a slip with a particle size below 45 μm with the following characteristics:

Density=1.600 g/cm$^3$
Viscosity=20 s
Reject at 40 μm=0.1%

The resulting slip is stored in a reservoir where it is kept under continuous agitation.

In a second grinding the size of the feldspathic materials and the remaining materials is reduced until achieving a particle size below 45 μm.

Density=1.690 g/cm$^3$
Viscosity=24 s
Reject at 40 μm=0.9%

This second slip is unloaded in the reservoir where the slip resulting from the first grinding is located and it is all subjected to agitation.

Spray drying is then performed until achieving a product with a water content of 8% by weight.

The wet material is subjected to shaping and ultra-pressing at 450 kg/cm$^2$.

It is then dried by means of heat in a drying line until achieving a product with a water content of 0.5% by weight.

The dry product is subjected to firing at a cycle of 180 min and achieving a highest temperature of 1,155° C.

The resulting product has the following characteristics:

2 cm thickness, 3.2 meters in length and 1.44 in width.
9% shrinkage
0.01% internal porosity measured by means of an autoclave by impregnating with water at room temperature and 600 mmHg
2.46 g/cm$^3$, measured by immersion in water applying Archimedes' principle at room temperature
71% of glassy phase.

The invention claimed is:

1. A compacted ceramic material comprising between 40%-85% by weight of glassy phase, having a density between 2.3 and 3.0 g/cm$^3$, and an internal porosity of less than 0.5% by volume of the total volume of the material, wherein starting materials comprise potassium feldspar in a range of 15-25% by weight out of the starting materials, and sodium feldspar in a range of 35-45% by weight out of the starting materials, and wherein sodium feldspar and potassium feldspar comprise feldspar particles and at least 95% of the feldspar particles have a size of less than or equal to 40 μm.

2. A compacted ceramic material according to claim 1, having an internal porosity between 0.01% and 0.5% by volume.

3. A compacted ceramic material according to claim 1, comprising between 50%-70% by weight of glassy phase.

4. A compacted ceramic material according to claim 1, having a density between 2.5 and 2.8 g/cm$^3$.

5. A compacted ceramic material according to claim 1, wherein the starting materials comprise an amount of feldspars between 50% and 70% by weight of the total starting materials.

6. A building material comprising a compacted ceramic material according to claim 1.

7. A method for obtaining the compacted ceramic material according to claim 1, comprising the following steps:
   a) Grinding the raw materials to reduce them to a particle size of less than 100 microns;
   b) Shaping and compacting the raw materials at pressures exceeding 400 kg/cm$^2$;
   c) Firing at a maximum temperature comprised between 1,000° C. and 1,200° C.

8. A method according to claim 7, where the grinding step a) reduces the raw materials to particle sizes of less than 50 microns.

9. A method according to claim 7, wherein the compacting step b) is performed by applying a pressure exceeding 450 kg/cm$^2$.

10. A method according to claim 7, which comprises applying a firing cycle c) until reaching a temperature comprised between 1,100° C. and 1,160° C.

11. A method according to claim 7, which includes a preparation step for preparing the ground raw material composition, where the composition comprises between 20% and 35% by weight of clays and between 50% and 70% by weight of feldspars.

12. A compacted ceramic material according to claim 1, wherein at least 99% of the feldspar particles have a size of less than or equal to 40 μm.

13. A compacted ceramic material according to claim 2, having an internal porosity between 0.01% and 0.3% by volume.

14. A compacted ceramic material according to claim 3, comprising between 55%-65% by weight of glassy phase.

15. A compacted ceramic material according to claim 5, wherein the starting materials comprise an amount of feldspar between 55% and 70% by weight of the total starting materials.

16. A method according to claim 8, where the grinding step a) reduces the raw materials to particle sizes of less than 45 micrometers.

17. A method according to claim 9, wherein the compacting step b) is performed by applying a pressure exceeding 500 kg/cm$^2$.

18. A method according to claim 10, which comprises applying a firing cycle c) until reaching a temperature comprised between 1,120° C. and 1,150° C.

* * * * *